Oct. 8, 1935.  J. R. JAMES  2,016,603
SELF STARTING MOTOR FOR ALTERNATING CURRENTS
Filed Dec. 23, 1931
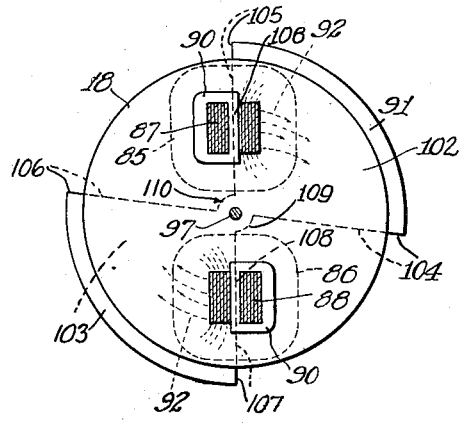
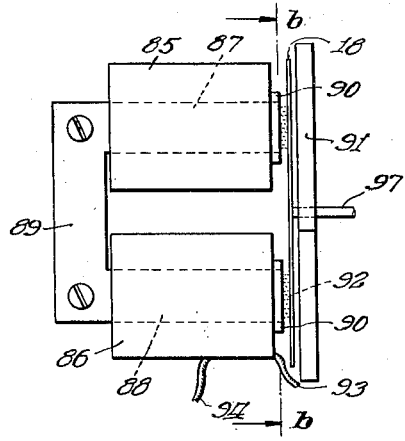
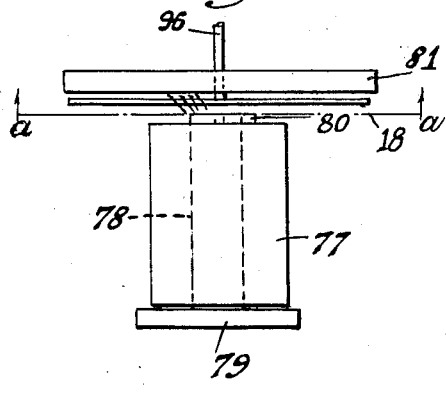
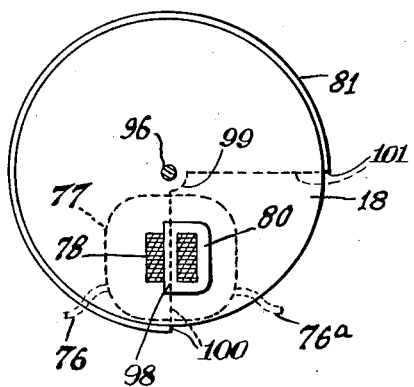
Witness:
V. Siljander
Inventor
John R. James
By Ernst E. Tupes
Atty.

Patented Oct. 8, 1935

2,016,603

UNITED STATES PATENT OFFICE 2,016,603

SELF STARTING MOTOR FOR ALTERNATING CURRENTS

John R. James, Story City, Iowa

Application December 23, 1931, Serial No. 582,721

11 Claims. (Cl. 172—278)

My invention relates to electric alternating current motors that provide self-starting characteristics in a predetermined direction and operate at substantially a uniform speed irrespective of the usual variations in line voltages.

It contemplates more particularly alternating current motors that will have a substantially uniform rotary speed in spite of the usual variations in line voltages so as to be adaptable for clock and similar mechanisms that require substantially uniform rotary actuation and operation.

One object of the present invention is the provision of an improved motor comprising an electromagnet and a rotor so positioned as to be rotated by the driving action of the alternating magnetic flux.

Another object of the invention is the provision of a novel motor for use in an alternating current circuit to create an alternating magnetic field including means for controlling the direction of the alternating magnetic lines of flux of said field to rotate an armature positioned in the field.

Still another object of my invention is the provision of an improved electromagnet in combination with an armature actuated by the driving force of the alternating magnetic flux and means to direct the magnetic lines of flux adjacent the armature in directions tending to increase their driving effect on the armature.

A further object of my invention is the provision of an improved electromagnet and means to direct and concentrate a portion of the magnetic lines of flux along the sides and in an armature in a manner to drive the armature.

A still further object of my invention is the provision of a motor of the kind described comprising a rotor and an electromagnet which creates eddy currents in the rotor of substantially constant magnitude, thereby tending to cooperate with the alternating magnetic flux emanating from the means provided to start and maintain rotor operation in a predetermined direction and at substantially uniform speed.

Still a further object is to provide an alternating current motor that has predetermined starting characteristics and means for maintaining a substantially uniform and balanced speed of rotation.

Other objects and advantages will appear from the following description of an illustrative embodiment of the invention.

In the drawing:

Figure 1 is a view in elevation of a motor embodying the principles of my invention.

Figure 2 is a plan view of that portion of Figure 1 lying above line a—a in Figure 1.

Figure 3 is a right side view of that portion of Figure 4 lying to the right of line b—b in Figure 4.

Figure 4 is a view in elevation of the motor shown in Figure 3.

The structure selected for illustration comprises a motor having, in this instance, a disc-like rotor 18 which is constructed of electrically conductive non-magnetic metal. The rotor 18 is, in this instance, mounted on an axial shaft 96 for rotation in confronting relation with a single field coil 77 having a laminated core 78 extending to its full length (Figures 1 and 2). The coil 77 with its core 78 is preferably positioned so that its longitudinal axis is paralled to the shaft 96 and laterally off-set therefrom within the confines or limits of the rotor 18 having its plane surface disposed normal thereto and adjacent one end of the coil 77 and its core 78.

A metallic segment or member 79 preferably of magnetic metal completely covers the other or remote end of the coil 77 and the core 78 which is opposite that end of the coil and core adjacent the rotor 18. In this instance, a shading coil 80 preferably of non-magnetic metal is disposed adjacent the first named end of the core 78 for attachment thereto and lies between the coil 77 and the adjacent face of the rotor 18, it being substantially D-shaped in configuration and serves as a retarding influence upon the rotor 18 as will appear more fully hereinafter. It is worthy of note, however, that the shading coil 80 need not have a substantially D-shaped configuration in order to serve its purpose, but this shape is found to be more easily adapted to the core 78 and such advantageously serves to hold the laminations of the core 78 together. As shown, the straight leg 98 of the shading coil 80 is radially disposed so as to extend over the end of the core 78 in a direction normal to the shaft 96.

Another segment or member 81 of magnetic metal and preferably though not essentially of circular configuration, is disposed above and in confronting relation with the rotor 18. The segment or member 81 has, in this instance, a quadrant 99 removed therefrom so that the correspondingly shaped open area thereof will be defined by radial edges 100 and 101 which merge with the periphery of the segment or member 81 to outline the shape thereof. The metallic segment or member 81 is, however, positioned adjacent the opposite face of the rotor 18; consequently the shading coil 80 is proximate one face thereof while the metallic segment or member 81 is adjacent the other rotor face 18. The non-magnetic shading coil 80 and magnetic segment or member 81 are positioned adjacent opposite faces of the rotor 18 which is disposed therebetween. The segment or member 81, in this instance, is so positioned that its radial edge 100 is in linear alignment with the straight leg 98 of the shading coil 80 which lies primarily in the open quadrant of the segment 81.

The rotor 18 is, in this instance, fixedly mounted on a shaft 96 which is suitably supported at its extremities in bearings of standard construction (not shown) for rotation with the rotor 18 between the non-magnetic metallic shading coil 80 and the magnetic segment 81. Now, then, when the terminals or lead wires 76 and 76a of the coil 77 are connected to an alternating current circuit, an alternating magnetic flux 74 is generated or produced and emanates outward from the end of the coil 77 with its core 78 adjacent one face of the rotor 18. This flux is generated or produced during the half cycle when the above mentioned coil and core ends are of a north polarity, and the alternating magnetic flux simultaneously induces currents in the non-magnetic metallic shading coil 80 and the magnetic metallic segment 81, since both are positioned in the path of the alternating magnetic flux. During the next half cycle when the same coil and core ends are of a south polarity, there is then no magnetic flux emanation, but the induced currents within the shading coil 80 and segment 81 which still have a north polarity are attracted toward the end of the coil 77 and core 78.

During the next half cycle when the same coil and core ends are again possessed of a north polarity, then the induced currents which have just previously been attracted, are now repelled by the magnetic flux 74 of a north polarity. At this time, additional currents are induced in the shading coil 80 and the segment 81. Now, then, the rotor 18 being constructed of electrically conductive non-magnetic metal, rotates toward the radial edge 100 of the segment 81 due to the fact that the flux 74 is of greater magnitude than the induced currents during each half cycle when there is repulsion and, further, because the rotor 18 is in the direct path of the flux and currents where the repulsion is the greatest. The magnetic metallic segment 81 produces a strong rotor propelling torque because of its large area wherein are retained stronger induced currents and further, because the rotor 18 rotates between the segment 81 and the adjacent end of the coil 77 and core 78 so as to be directly in the path of the magnetic flux and induced currents where the repulsion is the greatest. The non-magnetic metallic shading coil 80 produces a comparatively weaker opposing torque which has a retarding influence upon the rotor 18. The opposing torque is weaker because the shading coil 80 has a substantially smaller area than the segment 81 and, therefore, has a correspondingly smaller capacity for retaining induced currents. Then, too, the rotor 18 rotates in the path where the repulsion of the flux and the induced currents is the least.

Consequently when there is a change in line voltage, there is a corresponding change in both the rotor propelling and opposing torque values. Any variation in the speed of the rotor 18 is, therefore, the difference between the two opposing torques or forces that are acting upon the rotor 18 at the time of any line voltage variation. The actual speed variation in the rotor 18 in such instances is, therefore, far less than the usual variations that occur in motors having the usual single directional torque or force acting on the rotor 18. In the latter instances, any variation in line voltage directly influences the rotor speed a corresponding degree rather than to an appreciable lesser extent constituting a factor that is the difference in opposing torque valuations present in the structure described supra.

A modified embodiment of the invention is illustrated in Figures 3 and 4 wherein a pair of field coils 85 and 86 serve to provide the alternating magnetic flux 92 when connected to an alternating current source through the coil terminal leads 93 and 94. The coils 85 and 86 have laminated cores 87 and 88 extending to their full length, the cores 87 and 88 being connected together at one of their ends by a yoke 89. These coils 85 and 86 may be connected in series or parallel, but always so that they have opposite polarities at their ends adjacent the rotor or disc 18. As shown, the rotor 18 is mounted on the shaft 97 which is disposed intermediate the coils 85 and 86 which are in spaced parallel relation therewith. The shading coils 90 are, in this instance, so positioned that the straight legs 108 thereof are in linear alignment with the radial edges 105 and 107 of the segment quadrants 102 and 103. In consequence thereof, the shading coils 90 are positioned primarily in the open areas 109 and 110 of the segment or member 91 between the quadrants 102 and 103.

A pair of shading coils 90 of non-magnetic metal are, in this instance, positioned adjacent one face of the rotor 18 that confronts the free extremities of the cores 87 and 88 for attachment thereto and lies between the ends of the coils 85—86 and the adjacent face of the rotor 18, these being preferably though not essentially of substantially D-shaped configuration and serve as a retarding influence upon the rotor 18. As stated, these comparatively small shading coils 90 are preferably though not essentially substantially D-shaped in configuration, because this particular shape is found to be most easily adapted to the ends of cores 87 and 88 to hold the laminations together. With this arrangement the straight legs 108 of the shading coils 90 are radially disposed so as to extend over the ends of the cores 87 and 88 in a direction normal to the shaft 96. A comparatively larger segment or member 91 of magnetic metal comprising, in this instance, two oppositely positioned quadrants 102 and 103, each approximating a ninety-degree sector in angular extent defined by radial edges 104—105 and 106 and 107, is positioned adjacent the other face of the rotor 18 on the side thereof opposite to the shading coils 90.

With this arrangement, when the terminals or lead wires 93 and 94 of the coils 85 and 86 are connected to an alternating current circuit so as to have opposite polarities at the coil and core ends adjacent the rotor 18, an alternating magnetic flux 92 is generated or produced and emanates outward from the end of the coils 85 and 86 with their laminated cores 87 and 88 adjacent one face of the rotor 18. This flux is generated or produced during the half-cycle when the above mentioned coil and core ends are of a north polarity. Because the operation of each coil 85 and 86 is identical, reference will only be made to a single coil with its core and auxiliary parts.

Now, then, the coil 85 and its core 87, the magnetic flux of a north polarity simultaneously induces currents in the non-magnetic metallic shading coil 90 and sector 102 of the magnetic metallic segment or member 91 since both are positioned in the path of the alternating magnetic flux.

During the next half-cycle when the same coil and core ends are of a south polarity there is then no flux emanation but the induced currents within the shading coil 90 and the segment or member 91 which still have a north polarity, are now attracted toward the end of the coil 85 and its core 87. During the next half-cycle when the same coil and core ends are again possessed of a north polarity, then the induced currents which have just previously been attracted are now repelled by the magnetic flux 92 of a north polarity. At this time, additional currents are induced in the shading coil 90 and the sector 102 of the segment or member 91. Now, then, the rotor 18 being constructed of electrically conductive non-magnetic metal, rotates toward the radial edge 105 of the sector 102 of the segment or member 91 due to the fact that the flux 92 is of greater magnitude than the induced currents during each half-cycle when there is repulsion and, further because the rotor 18 is in the direct path of the flux and currents where the repulsion is greatest.

The magnetic metallic segment or member 91 tends to close the magnetic fields of the end of each core adjacent the rotor, due to the fact that it is positioned in a part of the path of the alternating magnetic flux that emanates therefrom. Some of the flux and induced currents pass from one core to the other through the magnetic metallic segment or member 91 which is the path of least resistance. The magnetic metallic segment or member 91 produces a strong rotor propelling torque because of its large area wherein are retained stronger induced currents, and, further, because the rotor 18 rotates between the segment or member 91 and the adjacent end of each coil and core so as to be directly in the path of the magnetic flux and induced currents where the repulsion is the greatest. The non-magnetic metallic shading coils 90 produce comparatively weaker opposing torques which have a retarding influence upon the rotor 18, the opposing torques being weaker due to the fact that the shading coils 90 have a smaller area than the segment or member 91 and, therefore, have a correspondingly smaller capacity for retaining induced currents. Further, the opposing torque has a lesser retarding influence upon the rotor 18 because it rotates in the path where the repulsion of the flux and the induced currents is the least.

The yoke 89 serves to close the magnetic field of the cores 87 and 88, thereby providing a path for the alternating magnetic flux. It will be seen, therefore, that the non-magnetic metallic shading coils 90 and magnetic metallic segment or member 91 serve to set up opposing torques that act on the rotor 18 in much the same way as the non-magnetic metallic shading coil 80 and the magnetic metallic segment or member 81 of the embodiment disclosed in Figures 1 and 2. These metallic shading coils 90 and the metallic segment 91 insure a substantially uniform speed even though the usual variations occur in line voltage under normal operating conditions. The embodiments of the invention disclosed in Figures 1, 2, 3, and 4 may be utilized in conjunction with different types of coils and their design as well as number may be varied to correspond with the requirements of commercial practice.

Various changes may be made in the embodiment of this invention herein specifically defined without departing from or sacrificing any of the advantages of the invention as defined in the appended claims.

What I claim as new and desire to secure by Letters Patent is:

1. A self-starting motor for alternating current comprising a stator having a plurality of field coils with cores extending axially therethrough, a yoke connecting said coil cores together, a disc-like rotor having one face thereof positioned in closely spaced relation to the ends of the coil cores from which the alternating magnetic flux emanates, a magnetic metallic member comprising oppositely positioned quadrants of a circle disposed in closely spaced relation to the other rotor face on the side opposite that of the field coils, said magnetic metallic member having open areas so that the opposite quadrants thereof partially extend over said coil core ends to initiate rotor rotation in a predetermined direction, and shading coils associated with said field coils to impart a retarding influence to said rotor for maintaining a substantially uniform rotor speed.

2. A self-starting motor for alternating current comprising a stator having field coils with cores extending axially therethrough, a yoke connecting said cores together, a disc-like rotor having one face thereof positioned in closely spaced relation to the ends of the coil cores from which the alternating magnetic flux emanates, a non-magnetic shading coil positioned between said coil core ends and confronting rotor face to retard the speed thereof, a magnetic metallic plate member disposed in closely spaced relation to the other rotor face on the side opposite that of the field coils so as to lie in the path of the alternating magnetic flux, said magnetic metallic plate member having an open area so as to partially extend over said coil core ends, said shading coils and plate member serving to provide a substantially uniform and balanced speed of rotor rotation.

3. A self-starting motor for alternating current consisting of a plurality of field coils having cores extending axially therethrough to provide a magnetic field, a rotor of electrically conductive metal mounted for rotation in said magnetic field, said rotor having one face thereof positioned in closely spaced confronting relation to an end of each coil, a magnetic metallic member positioned in closely spaced relation to the other rotor face on the side opposite that of said field coils, said magnetic metallic member extending partially over said coil core ends in the path of the alternating magnetic flux emanating from said field coils to initiate rotation of said rotor in a predetermined direction, and shading coils associated with said field coils to impart a retarding influence to said rotor for maintaining a substantially uniform rotor speed.

4. A self-starting motor for alternating current comprising a plurality of field coils having cores extending axially therethrough to provide a magnetic field, a disc-like rotor of non-magnetic metal having one face thereof positioned in closely spaced relation to an end of each coil, a metallic member positioned in closely spaced relation to the face of the rotor on the side opposite that of said field coils, said metallic member having open areas so as to partially cover one end of each coil to initiate rotor rotation in a predetermined direction, and shading coils associated with the free end of each coil confronting the other face of said rotor to impart a retarding influence to said rotor and cooperating with said metallic member on the opposite side of the rotor to provide a substantially uniform speed therefor.

5. A self-starting motor for alternating current consisting of a stator having a plurality of coils with cores to provide an alternating magnetic field emanating from their ends, a rotor disc having one face thereof positioned in closely spaced relation to corresponding ends of said coils, a magnetic metallic member positioned in closely spaced relation with the other face of said rotor on the side opposite to the first named face to initiate and maintain the rotation of said rotor in a predetermined direction, and shading coils positioned between the first named face of said rotor and each of said coil ends in the path of the alternating magnetic flux, said shading coils serving to retard said rotor and cooperating with said metallic member to maintain rotor rotation at a more balanced or uniform speed even though fluctuations in line voltages occur.

6. A self-starting motor for alternating current comprising coils with cores extending axially therethrough, a flat circular-shaped rotor having one face thereof positioned in closely spaced relation to the end of said coils; a magnetic metallic plate member positioned in closely spaced relation to the other face of the rotor on the side opposite that of the coils, said magnetic metallic plate member having opposing sectors interrupted by open quadrants positioned so as to partially cover one end of each coil and core, and a shading coil positioned in close relation to the free end of each coil and core so as to lie adjacent the first named confronting face of said rotor and substantially in confronting alignment with the open quadrants of said metallic plate member to impart a balanced influence to the speed of said rotor.

7. A self-starting motor for alternating current consisting of a plurality of field coils having cores extending axially therethrough to provide an alternating magnetic field, a non-magnetic metallic rotor mounted so that one face thereof is positioned in closely spaced relation to an end of each coil, a substantially D-shaped non-magnetic shading coil positioned proximate to the end of each of said coils adjacent the first named face of said rotor, and a magnetic metallic plate member positioned in closely spaced relation to the other face of the rotor on the side opposite that of said field coils, said magnetic member having open areas therein which are substantially in confronting relation with each shading coil and partially extends over said coil core ends to insure a substantially uniform rotor speed even though the usual variations in line voltage occur during the operation of said rotor.

8. A self-starting motor for alternating current consisting of a stator having a plurality of field coils with cores extending axially therethrough, a non-magnetic disc-like rotor positioned in the magnetic field generated by said coils to effect rotor rotation, shading coils provided intermediate said field coils and the confronting face of said rotor, and a magnetic plate member positioned adjacent the other face of said rotor on the side opposite to said field coils, said magnetic plate member partially confronting said cores with the shading coils off-set therefrom so that said rotor is influenced by said field coils, shading coils and magnetic plate member to provide self-starting characteristics and substantially uniform rotor speed.

9. A self-starting motor for alternating current comprising a stator with a plurality of field coils each having a core extending axially therethrough, a non-magnetic rotor positioned in the magnetic field generated by said coils, a shading coil positioned between an end of each coil and the confronting face of said rotor, and another magnetic metallic plate member positioned adjacent the other face of said rotor on the side opposite to said first named face, said magnetic plate member having sectors removed therefrom directly in confronting alignment with each shading coil and part of each field coil, said shading coils and metallic plate member serving to impart self-starting and substantially uniform speed characteristics to said rotor.

10. A self-starting motor for alternating current consisting of a pair of field coils with cores extending axially therethrough, said cores being connected at one end by means of a yoke, a non-magnetic disc-shaped rotor mounted for rotation so that its one face thereof is in closely spaced relation with the free ends of the coil cores, a magnetic metallic segment having open areas so that the opposite quadrants thereof partially extend over said coils and open core ends, said segment being positioned in closely spaced relation to the other face of the rotor opposite the coils and cores to provide a rotor propelling torque and tend to close the magnetic field, a pair of non-magnetic shading coils each being positioned between the coil and core ends and the adjacent face of the rotor, said shading coils being positioned in confronting relation with the open areas of the segment to provide an opposing torque to retard the speed of the rotor for substantially uniform rotation in spite of the usual voltage variations.

11. A self-starting motor for alternating current consisting of a field coil with a core extending axially therethrough, a non-magnetic disc-shaped rotor mounted for rotation so that its one face is in closely spaced relation with one end of the coil and core, a magnetic metallic segment having an open area defined by a radial edge that extends over said coil and core end, said segment being positioned in closely spaced relation to the other face of the rotor opposite the coil and core to establish a rotor propelling torque, a non-magnetic shading coil being positioned between the coil and core end and the adjacent face of the rotor, said shading coil being positioned in alignment with the open area of the segment so as to provide an opposing torque to retard the speed of the rotor for substantially uniform rotation in spite of the usual voltage variations.

JOHN R. JAMES.